United States Patent
Sagi

[15] 3,674,176
[45] July 4, 1972

[54] DEVICE FOR HOLDING AND DISPENSING THERMOMETERS

[72] Inventor: Zsigmond Sagi, Parsippany, N.J.
[73] Assignee: Bio-Medical Sciences, Inc., Fairfield, N.J.
[22] Filed: March 4, 1971
[21] Appl. No.: 120,997

[52] U.S. Cl. .............................. 221/135, 206/16.5, 221/2, 221/26, 221/30, 221/70, 221/279
[51] Int. Cl. ........................................................ A24f 27/14
[58] Field of Search ........................................ 221/70-74, 26, 221/135, 2, 30, 279; 206/16.5

[56] References Cited

UNITED STATES PATENTS

| | | | |
|---|---|---|---|
| 2,409,362 | 10/1946 | Kleinmann | 221/70 X |
| 2,465,876 | 3/1949 | Hornung | 221/72 |
| 2,543,681 | 2/1951 | Voos | 221/70 |
| 3,051,584 | 8/1962 | Tindall | 221/70 X |
| 3,221,927 | 12/1965 | Lowry | 221/26 |
| 3,420,405 | 1/1969 | Taylor | 221/71 X |

*Primary Examiner*—Samuel F. Coleman
*Attorney*—Watson Leavenworth & Kelton

[57] ABSTRACT

A package for use with disposable thermometers of the type having a thermally sensitive substance on a thermally conductive sheet and an overlying transparent film carrying indicator means which are superpositionably registrable with the thermally responsive substance to denote temperature change upon change of state in the substance, which thermometer normally is provided with a removable shield interposed between the substance and the indicator means to prevent communication between the two until the thermometer is ready for use. The thermometers are disposed along and removably attached to a carrier tape which together as a unit are received in a housing with the thermometers arranged in a superposed stack and the carrier tape folded in a series of accordion pleat-like folds with each accordion pleat-like fold interleaved between adjacent ones of the thermometers and an end of the tape extending through an opening in the housing. Pull tab means on the shield of each thermometer are arranged in a similar stack disposition and are secured to an anchorage within the housing. Dispensing of the thermometers is effected by drawing the carrier tape and attached thermometers through the housing opening, such withdrawal of the carrier tape and each thermometer attached thereto being effective to initiate peeling away of the shield from the thermometer within the housing. The housing also includes means therein adjacent the opening thereof which applies during dispensing a wiping or pressing force to the transparent film on which is carried the indicator means to reseal the thermometers and press the transparent film into contact with the carrier sheet positioning the indicator means in proper overlying communicating registration with the temperature responsive substance on the carrier sheet.

22 Claims, 3 Drawing Figures

PATENTED JUL 4 1972

3,674,176

SHEET 1 OF 2

DEVICE FOR HOLDING AND DISPENSING THERMOMETERS

BACKGROUND OF THE INVENTION

In the concurrently filed application of Robert A. Lang entitled "Disposable Type Thermometer," there is described a thermometer having a thermally sensitive substance deposited on a thermally conductive sheet and an overlying transparent film carrying indicator means which cooperate with the thermally responsive substance to denote specified temperatures upon change of state of the substance, the thermometer being provided with a readily removable flexible shield interposed between the thermally responsive substance and indicator means to prevent communication and reaction between the two until the thermometer is actually required for use. The shield is readily removably adhesively secured to the transparent film and can be peelably removed therefrom by pulling action applied digitally to the pull tab at one end of the shield. Such type of thermometer can be employed for a range of testing purposes in recording temperature values with such thermometer type being most particularly suited for use with human test subjects for the purpose of recording temperature values in a clinical testing range. When used for such purpose it is a desirable requirement that the thermometers be packaged in a device compatible for storing the thermometers in a sterile condition and be maintained therein in such condition until the thermometers are actually required for use. Moreover, such packaging should provide that reasonable quantities of the thermometers be housed in a device convenient to use in hospitals, clinics, doctors' offices and other places where temperature testing of human test subjects occurs. Also, the packaging arrangement should be such as to permit ready and simple dispensing of thermometers as needed and should be done in such manner as to involve removal of the shield from the thermometer within the package at the time of use so that it is unnecessary for a nurse or other medical personnel to touch the temperature indicating end of the thermometer.

SUMMARY OF THE INVENTION

The present invention is concerned generally with an improved package for storage and dispensing of disposable chemical type thermometers. It is particularly concerned with providing a sterile package for use with thermometers of the character described in the aforementioned concurrently filed application of Robert A. Lang.

The present invention provides a package in which thermometers having shields made in accordance with the aforementioned patent application can be packaged in quantities of as many as a dozen or more to allow for protective sterile storage of the thermometers prior to use but make them readily operatively available when needed with removal of the thermometers from the package being achieved without need for touching the thermometer indicating end to remove the shield therefrom.

In accordance with the present invention, the package includes a plurality of thermometers disposed longitudinally spacedly along a carrier tape and removably attached to the tape. The thermometers and carrier tape are received as a unit within an elongated housing with the thermometers being arranged in stacked superposition and the carrier tape folded back and forth in a series of accordion pleat-like folds with each fold being interleaved between adjacent ones of the thermometers in the stack and having an end thereof extending through an opening in one end of the housing. Located within the housing adjacent the other end is an anchorage means to which the pull tab means of the shield of each thermometer is secured, the pull tab means being arranged in a like stacked disposition. Biasing means also are provided in the housing and are engageable with the stack of thermometers for maintaining the stack in a compacted positioning and positioned longitudinally of the housing so that the stack is disposed substantially symmetrically on either side of a longitudinal plane extending through the housing and opening therein. Such biasing means conveniently comprise a pair of springs disposed one each at opposite sides of the stack and engaging with top and bottom wall structure respectively of the housing. For dispensing a thermometer from the housing a user draws the carrier tape and a thermometer attached thereto through the opening in the end of the housing. Such drawing action initiates peeling removal of the shield from the particular thermometer as a certain length of the carrier tape and thermometer is being dispensed through the opening. Located within the housing adjacent the opening thereto are one or more sets of rollers comprising a pressing means which apply a pressing force against the thermometer to press the remaining portion of the strips thereof which comprise the thermometer and on which are carried the temperature indicating components, into face-to-face contact following removal of the shield from therebetween. Thus, when the certain length of carrier tape and attached thermometer is fully removed from the housing through the opening therein, it is in operative condition with the temperature indicating components thereof in operative communication. With the carrier tape and thermometer fully removed from the housing, the carrier tape may be severed to remove the certain length thereof from that portion of carrier tape remaining in the housing, but leaving a new end of the carrier tape in the housing opening for initiating withdrawal of the next thermometer. The withdrawn or dispensed thermometer then can be removed from its associated certain length of carrier tape by merely breaking the bonded connection between them, such connection being in any suitable form such as a heat seal connection.

Further in accordance with the invention, at least one set of the rollers which apply pressing force to the thermometer include a resilient surface on one or both rollers of the pair to insure a uniform application of pressing force transversely of the thermometer indicating end to insure optimum resealing of the thermometer indicating end.

Moreover, the invention provides that indicia means in the form of printed numbering be provided on the carrier tape to indicate the number of thermometers remaining in the housing following the removal of any particular thermometer therefrom.

The invention, accordingly, comprises the package possessing the features, properties and relation of elements which will be exemplified in the device hereinafter described and the scope of the present invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which.

DESCRIPTION OF THE PREFERRED EMBODIMENT

Figure 1:
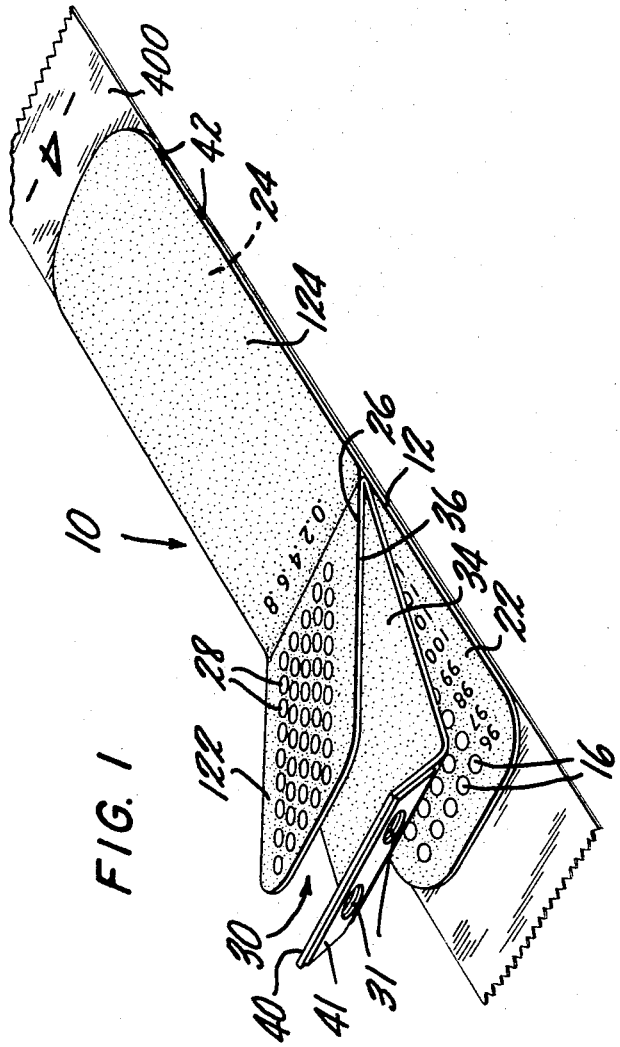
FIG. 1 is a perspective view of a thermometer of the type embodied in the package of the present invention, The temperature indicating end of the thermometer being opened and the tab of the shield being folded outwardly thereof, the thermometer being removably attached to a certain length of the carrier tape.

A type of disposable thermometer which can be embodied in the package 5 of the present invention is shown in FIG. 1. Such thermometer 10 is comprised of a thermally conductive sheet 12 provided at an end portion or indicator section 22 with a matrix of depressions in each of which is contained a thermally responsive substance 16, the other portion of the sheet 12 providing a handle section 24. Coextensive and superposed with the sheet 12 is a transparent film 26 which has an indicator section portion 122 and is provided with an adhesive underface to which is secured a corresponding matrix of indicator means 28 cooperative with the thermally responsive substance when in communication with the latter and when a change of state occurs in such substance to evidence such state change and hence signal precise temperature values. The transparent film 26 also has a handle section portion 124 adhesively secured to handle section 24. Intervening indicator sections 22 and 122 is a shield 30 which prevents face-to-face contact of such sections and operative communication between the thermally responsive substance 16 and indicator means 28 until the thermometer is required for use, the shield being peelably removable to permit the indicator sections 22, 122 to be pressed into face-to-face contact when the thermometer is to be used. The shield 30 is a flexible sheet having a number of folds therein providing a first portion 36 co-extensive with indicator section 122 of the transparent film 26 and being removably adhered thereto, a second portion 34 coextensive with indicator section 22 of sheet 12 and a third portion 40 providing a tab for peelably removing the shield from between indicator sections 22 and 122, the tab desirably having several openings 31 therethrough and being provided further with a reinforcing tape 41 to prevent tearing of the tab 40 from portion 34 during dispensing. The thermometer 10 is shown disposed on and removably secured to a carrier tape 400, only a portion of length of the carrier tape employed in the package 5 in association with a plurality of thermometers being shown. For the purpose of removably attaching the thermometers 10 to the carrier tape 400, any suitable bonded connection between the two as at points 42 shown in FIG. 1 can be employed. The bonded connection can be one employing an adhesive or if the thermometer materials and the carrier tape itself are amenable to heat sealing, the bond can be effected by means of heat seal connection.

Figure 3:
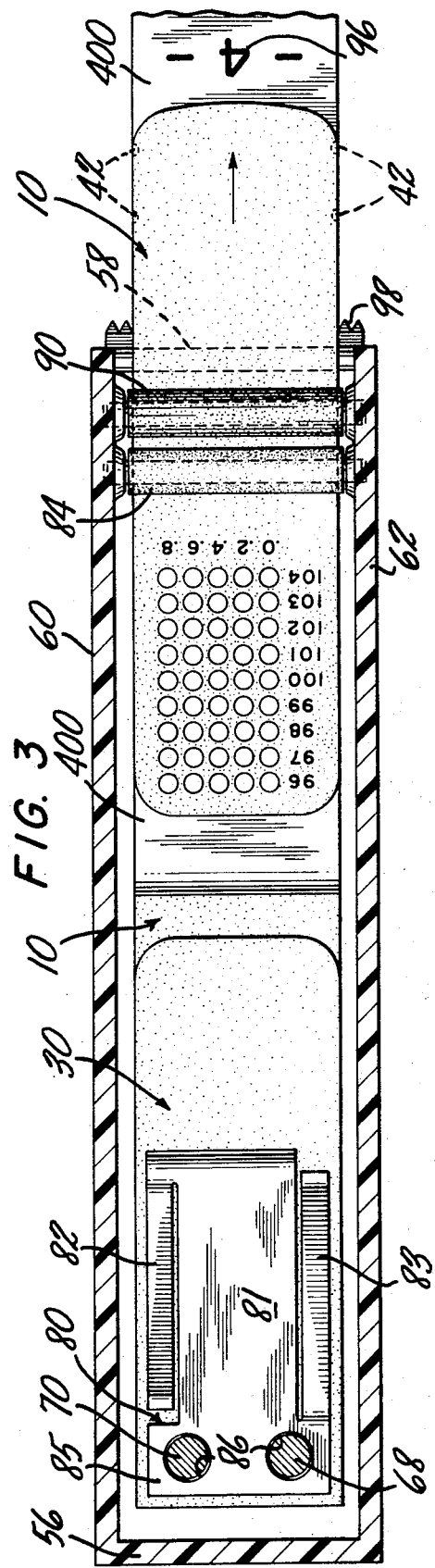
FIG. 3 is a plan view in section of the dispenser shown in FIG. 2 as taken along the line III—III therein.
Figure 2:
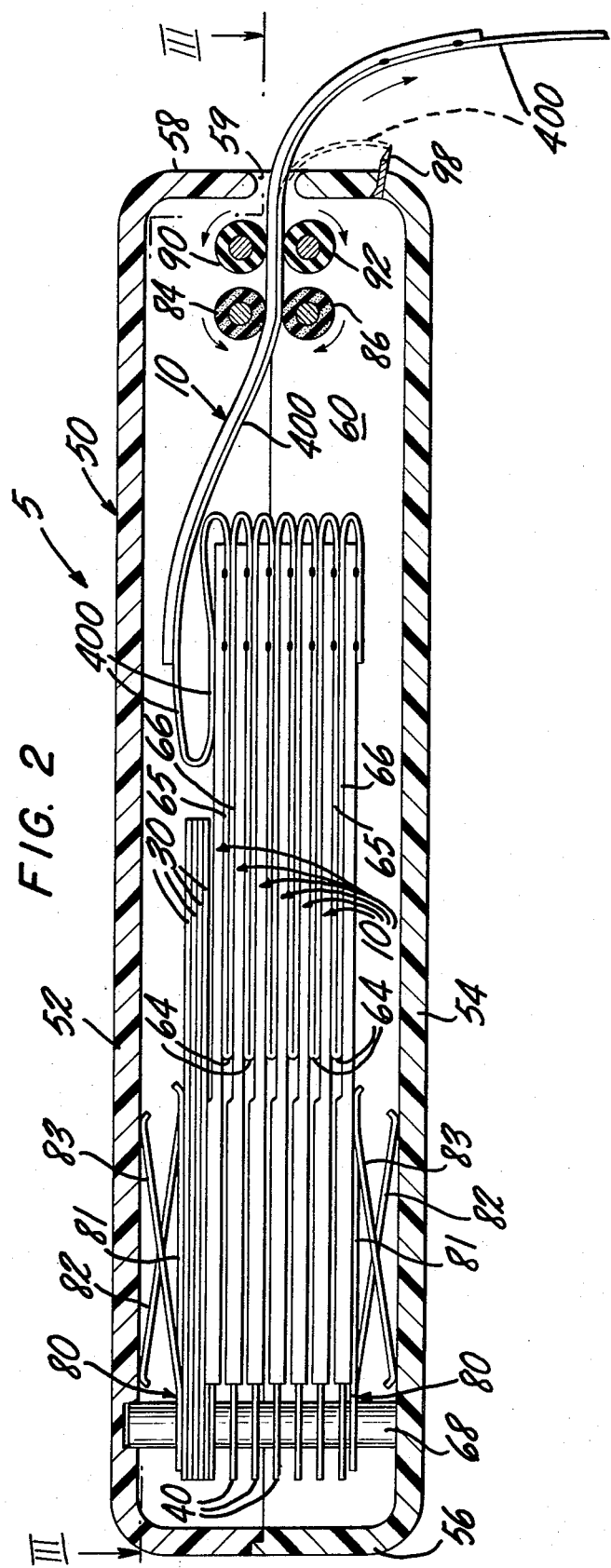
FIG. 2 is a side elevational view in section of a package according to the present invention, a plurality of stacked thermometers attached to a carrier tape being disposed in the package housing, one thermometer being shown partially withdrawn from the housing, the shields of previously removed thermometers being shown retained within the housing.

Turning now to a consideration of the package 5 continuing reference will be had to FIGS. 2 and 3. The package 5 includes elongated housing 50 comprising spaced generally parallel top and bottom walls 54 between which extend a pair of end walls 56 and 58 one end wall 58 being provided with a transverse opening 59. Furthermore, front and rear side walls 60 and 62 can be embodied in the housing. For convenience and as depicted best in FIG. 2, the housing can be made in two substantially identical pairs, being molded from any suitable material including a wide range of thermoplastics, with the housing halves being secured together in any suitable and convenient way. The plurality of thermometers 10 and carrier tape 400 are received in the housing 50 with the thermometers arranged in a superposed stack extending longitudinally of the housing with the carrier tape 400 being folded back and forth in a series of accordion pleat-like folds 64 with each fold 64 being interleaved between adjacent ones of the thermometers 10. Thus, as shown in FIG. 2 each fold 64 includes two fold parts to one 65 of which is attached a thermometer 10 with the other fold part 66 disposed against the next succeeding thermometer in the stack. With the thermometers 10 disposed in the housing 50, the pull tab 40 of the shield 30 in each thermometer is folded outwardly of the thermometer indicating end and extends longitudinally of the thermometer in the corresponding stack arrangement of pull tabs 40 shown in FIG. 2 with each of the respective pull tabs fixed to a pair of anchorage posts 68, 70, the openings 31 in the pull tabs being received on the posts. With the pull tabs thus firmly anchored in the dispenser, the withdrawal of a thermometer will automatically initiate and effect peelable removal of the shield from the thermometer during dispensing.

In order to maintain the stack of thermometers disposed longitudinally of the housing 50 and symmetrically of housing opening 59, i.e., substantially uniformly at opposite sides of a longitudinal plane passing through the housing and the opening, the stack is maintained in such disposition by means of a pair of biasing springs 80 located one above and one below the stack. Each biasing spring 80 includes a generally flat plate part 81 along the opposite margins of which are formed a pair of spring fingers 82, 83 which extend from the flat plate part into engagement with the top and bottom walls of the housing. The spring fingers thus apply a pressing force to the flat plate part 81 to compact the stack of thermometers and maintain it properly positioned in the housing 50. The flat plate part 81 has a laterally widened part as at 85 provided with a pair of openings 86 which can be received on the anchorage posts 68, 70 to fix the spring in the housing and prevent any longitudinal or lateral movement thereof.

During the dispensing of a thermometer 10 and following removal of the shield 30 therefrom, it is necessary to press the transparent film portion of each thermometer which carries the indicator means against the thermally conductive strip on which is disposed the thermally responsive substance. This is done to insure proper resealing of the thermometer indicating end and to registrably superpose the indicator means above the thermally responsive substance. For this purpose pressing means are provided in the housing 50 in the form of a first pair of rollers 84, 86 and a second pair of rollers 90, 92. The roller pairs are supported in the housing for rotation about axes transverse of the housing and being spaced in opposition to form nips between each pair. The first pair of rollers 84, 86 are located adjacent the opening 59 and the second pair of rollers 90, 92 are located by the opening and intermediate it and the first pair. Thus, in the passage of the thermometers 10 and carrier tape 400 through the opening 59 they must pass through the roller pairs in the manner shown in FIG. 2 to apply pressing force in the manner aforesaid. To insure uniform application of pressing force, the surface portions of the rollers 84, 86 are made of a readily compressible material which conformably contact the thermometers 10 during dispensing to insure uniform application of such pressing force thereto. The second set of rollers 90, 92 need not be of a resilient character and can be relatively hard surfaced material. Such second set of rollers thus is capable of serving as a fixing or gauging means to insure proper resealing of the thermometer indicating end, that is, detect the overall thickness of the thermometer and the carrier tape at that point to insure that resealing has been effected.

A further understanding of the invention can be had from a discussion of the manner in which thermometers 10 are dispensed therefrom. When the plurality of thermometers attached to the carrier tape 400 are inserted in the housing 50 with their pull tabs 40 received on the anchorage posts 68, 70, one end of the carrier tape is extended through the opening 59 and a distance therebeyond. The first thermometer 10 in the stack of course will be superposed with all others as for example, in the stacking depicted in FIG. 2. When it is desired to dispense the first thermometer 10, a pulling force is applied to the carrier tape 400 and the first thermometer 10 and a certain length of the carrier tape 400 will be drawn outwardly through opening 59 in the course of such passage passing through the pairs of rollers and resulting in the unfolding of one accordion pleat-like fold 64 of the carrier tape. With the thermometer 10 fully exited from the housing the certain length of carrier tape 400 associated therewith can be severed from that remaining in the housing leaving a free end of the carrier tape in the opening for initiating dispensing of the next thermometer. To facilitate such severance of the carrier tape a cutting edge component 98 can be provided on end wall 58 of the housing. During the dispensing of said first thermometer, the shield 30 thereof will pull away from the thermometer and remain in the housing, a number of such removed shields being depicted in FIG. 2. During passage through the pairs of rollers, the resealing and proper positioning of the indicator means and thermally responsive substance will be effected as described earlier. With an end of the carrier tape 400 remaining in the opening 59 the accessibility of such carrier tape for initiating removal of the next thermometer is assured.

To facilitate visually determining the number of thermometers remaining in the package, the carrier tape in advance of each thermometer can be marked with indicia in the form of printed numbering 96.

Thus, it will be noted from the foregoing that the present invention provides a novel disposable thermometer package which can be used easily, conveniently and without subjecting the thermometers to contamination by unnecessary digital contact therewith before the thermometers are actually required for use. Moreover, the thermometers are retained housed in the package in an inoperative condition until required for use since it is only during dispensing that the protective seal is removed so that the operative temperature indicating components can be placed in communication.

What is claimed is:

1. A package for disposable type thermometers comprising in combination with an elongated carrier tape and at least one thermometer disposed along said carrier tape and removably attached thereto, said disposable type thermometer including at least two superimposed, co-extensive strips joined in adhesive face-to-face contact along corresponding first portions of the length of each strip, the remaining portions of the lengths of said strips carrying components having an operative association when said remaining portions are pressed into face-to-face contact for detecting and indicating temperature values, said remaining portions normally being intervened by a shield peelably removably secured to the remaining portion of at least one of said strips for preventing face-to-face contact of said remaining portions and the components carried on each of said remaining portions, said shield embodying pull tab means for initiating peeling removal of said shield, a housing having an opening therein, said carrier tape and said thermometer being received in said housing with one end of said carrier tape extending through said opening, anchorage means in said housing, the shield pull tab means of said thermometer being fixed to said anchorage means, said thermometer being dispensable from said housing through said opening in unison with a certain length of said carrier tape by means of pulling force applied to said one end of said carrier tape, said shield peeling from the remaining length portion of the strip to which it is attached upon application of said pulling force, and pressing means carried in said housing and disposed therein along the course of travel of said certain length of carrier tape and said thermometer within said housing for applying a pressing force against said thermometer to press said remaining portion of the strips thereof into face-to-face contact following removal of the shield from the thermometer.

2. The package of claim 1 wherein said housing is elongated and includes opposed top and bottom wall structure and opposed end walls extending between said top and bottom wall structure, said opening being in one of said end walls, said anchorage means being located adjacent the other of said end walls.

3. The package of claim 2 wherein said anchorage means comprises at least one post, the shield pull tab means of said thermometer being fixed to said post.

4. The package of claim 1 wherein said pressing means comprises at least one pair rollers arranged in opposed disposition to provide a nip therebetween, the certain length of said carrier tape and said thermometer passing through the nip of said roller pair during dispensing to effect application of said pressing force.

5. The package of claim 4 wherein at least one roller in said pair of rollers is provided with a resilient surface layer thereon.

6. The package of claim 1 wherein said carrier tape is of readily severable material to facilitate severance of said certain length of said carrier tape from any carrier tape remaining in said housing following dispensing of said thermometer therefrom.

7. The package of claim 6 wherein said housing is provided with cutting edge means thereon exteriorly adjacent said opening against which said certain length of said carrier tape can be drawn for severance thereof from any carrier tape remaining in said housing following dispensing of said thermometer therefrom.

8. The package of claim 1 wherein said thermometer is removably attached to said carrier tape with a bonded connection therebetween.

9. The package of claim 8 wherein said thermometer is attached to said carrier tape by means of an adhesive.

10. The package of claim 8 wherein said carrier tape and the strips of said thermometer are of materials amenable to heat sealing and the bonded connection of said thermometer to said carrier tape is a heat seal connection.

11. The package of claim 1 further comprising a plurality of thermometers disposed longitudinally spaced along and removably attached to one face of said carrier tape, said thermometers being received in said housing in a superposed stack arrangement thereof with the shield pull tab means of each thermometer fixed to said anchorage means in corresponding stacked arrangement, said carrier tape being folded in a series of accordion pleat-like folds, with each accordion pleat-like fold thereof interleaved between adjacent ones of the thermometers in said stack, each thermometer being removably attached to one of said folds.

12. The package of claim 11 wherein each accordion pleat-like fold in said carrier tape comprises the portion of such tape underlying each thermometer and the tape length extending between each said thermometer and that next succeeding in said stack of thermometers.

13. The package of claim 11 wherein indicia means are carried on said carrier tape denoting the quantity of thermometers which have been dispensed from said housing.

14. The package of claim 13 wherein said indicia means comprises printed numbers on said tape disposed such as to appear at said opening during dispensing in advance of thermometer associated with a respective number.

15. The package of claim 11 wherein said housing is elongated and includes opposed top and bottom wall structure and opposed end walls extending between said top and bottom wall structure, said opening being in one of said end walls, and biasing means in said housing and engageable with said stack of thermometers for maintaining said stack in compacted positioning and positioned longitudinally of said housing and disposed substantially symmetrically on either side of a longitudinal plane extending through said housing and opening.

16. The package of claim 15 wherein said biasing means comprises a pair of springs disposed one each at opposite sides of said stack of thermometers and engageable therewith and with said top and bottom wall structure respectively.

17. The package of claim 16 wherein said pair of springs each comprise a flat plate part engageable substantially conformably against said stack of thermometers, and at least one resilient spring finger extending from said flat plate part into engagement with the respective top and bottom wall structure.

18. The package of claim 17 wherein the plate part of said spring is fixed to said anchorage means.

19. The package of claim 17 wherein the plate parts of said springs extend substantially coextensively with said remaining portion of the lengths of the strips comprising said thermometers.

20. The package of claim 4 wherein said pair of rollers are disposed in said housing adjacent said opening and are rotatable about axes extending transversely of said housing and symmetrically of said opening.

21. A package for disposable type thermometers comprising in combination with an elongated carrier tape and a plurality of thermometers disposed longitudinally spaced along said carrier tape and removably attached thereto, each of said disposable type thermometers including at least two superimposed, coextensive strips joined in adhesive face-to-face contact along corresponding first portions of the length of each strip, the remaining portions of the lengths of said strips carrying components having an operative association when said remaining portions are pressed into face-to-face contact for detecting and indicating temperature values, said remaining portions normally being intervened by a shield peelably removably secured to the remaining portion of at least one of said strips for preventing face-to-face contact of said remaining portions to the components carried on each of said remaining portions, said shield embodying a pull tab for initiating peeling removal of said shield, an elongated housing comprising spaced top and bottom walls and a pair of end walls ending between said top and bottom walls, one of said end walls having an opening therein, said carrier tape and the plurality of thermometers attached thereto being received in said housing with said thermometers arranged in a superposed stack disposed longitudinally of said housing with the carrier tape folded in a series of accordion pleat-like folds, with each accordion pleat-like fold thereof interleaved between adjacent ones of the thermometers in said stack, and with one end of said carrier tape extending through said opening, an anchorage member disposed in said housing adjacent the other end wall thereof, the pull tabs of the thermometer shields being arranged in stacked disposition and being fixed to said anchorage member, said thermometers being dispensable successively from said stack through said opening in unison with certain successive lengths of said carrier tape by means of pulling force applied to said carrier tape, the shield peeling from the remaining length portion of the thermometer strip to which it is attached upon application of such pulling force, a pair of springs disposed in said housing one above and one below said stack of thermometers and engageable with said stack and respectively said top and bottom walls for compacting said stack and maintaining it positioned longitudinally of said housing and disposed symmetrically of said opening, and a pair of rollers disposed in said housing adjacent said opening and supported in said housing for rotation about axes transversely of said housing and in opposed disposition to provide a nip therebetween, each thermometer and certain length of carrier tape associated therewith passing through the nip of said roller pair during dispensing to apply a pressing force against each thermometer to press the remaining portion of the strips thereof into face-to-face contact following removal of the shield therefrom.

22. The package of claim 21 wherein said pair of rollers is provided with a resilient surface layer of a resilient material thereon, said resilient surface layer being compressible to conformably contact said thermometers to apply pressing force uniformly thereto, and a second set of rollers disposed in said housing intermediate said first pair and said opening and parallel with said first pair, the surface layer of said second pair being non-compressible relatively the character of the surface layer of said first pair.

\* \* \* \* \*